United States Patent [19]

Tajima et al.

[11] 4,382,293
[45] May 3, 1983

[54] SIGNAL PICKUP DEVICE IN ROTARY RECORDING MEDIUM REPRODUCING APPARATUS

[75] Inventors: Osamu Tajima; Takefumi Shioiri, both of Yokohama, Japan

[73] Assignee: Victor Company of Japan, Ltd., Yokohama, Japan

[21] Appl. No.: 254,055

[22] Filed: Apr. 14, 1981

[51] Int. Cl.³ .................. G11B 3/38; G11B 21/10
[52] U.S. Cl. ...................... 369/43; 369/139; 369/221; 358/907
[58] Field of Search ............... 369/170, 171, 172, 219, 369/220, 221, 43, 126, 139, 135; 358/128.5, 128.6, 312, 313, 322, 342, 335, 907; 360/10.1, 10.2

[56] References Cited

U.S. PATENT DOCUMENTS

| | | | |
|---|---|---|---|
| 3,992,017 | 11/1976 | Mori et al. | 369/170 |
| 4,075,418 | 2/1978 | Nemoto et al. | 369/170 X |
| 4,160,268 | 7/1979 | Goto et al. | 369/43 |
| 4,170,783 | 10/1979 | Tajima . | |

FOREIGN PATENT DOCUMENTS 55-122243 9/1980 Japan .................. 369/126

Primary Examiner—Bernard Konick
Assistant Examiner—Donald McElheny, Jr.
Attorney, Agent, or Firm—Louis Bernat

[57] ABSTRACT

A signal pickup device in a rotary recording medium reproducing apparatus comprises a cantilever having at a free distal end thereof a reproducing element for reproducing recorded signals from tracks of a rotary recording medium, a permanent magnet magnetized in an axial direction of the cantilever and fixed to the cantilever at proximal end thereof, an elastic support member extending perpendicular to a longitudinal direction of said tracks and supporting the proximal end of the cantilever so that the cantilever is rotatable, accompanied by elastic deformation of the elastic support member, and tracking control coil device supplied with a tracking control current to attract and repulse the permanent magnet to cause the cantilever to rotate. The reproducing element is displaced in a direction perpendicular to the longitudinal direction of the recording tracks of the rotary recording medium to tracks. The tracking control coil device comprises at least a single rear-side tracking coil disposed at a position opposite to the reproducing element with respect to the elastic support member to confront a magnetic pole of the permanent magnet and at least a single front-side tracking coil disposed at a position toward the reproducing element with respect to the elastic support member to confront an opposite magnetic pole of the permanent magnet, with axes of the rear-side and front-side tracking coils being arranged in a direction perpendicular to an axial direction of the cantilever.

6 Claims, 6 Drawing Figures

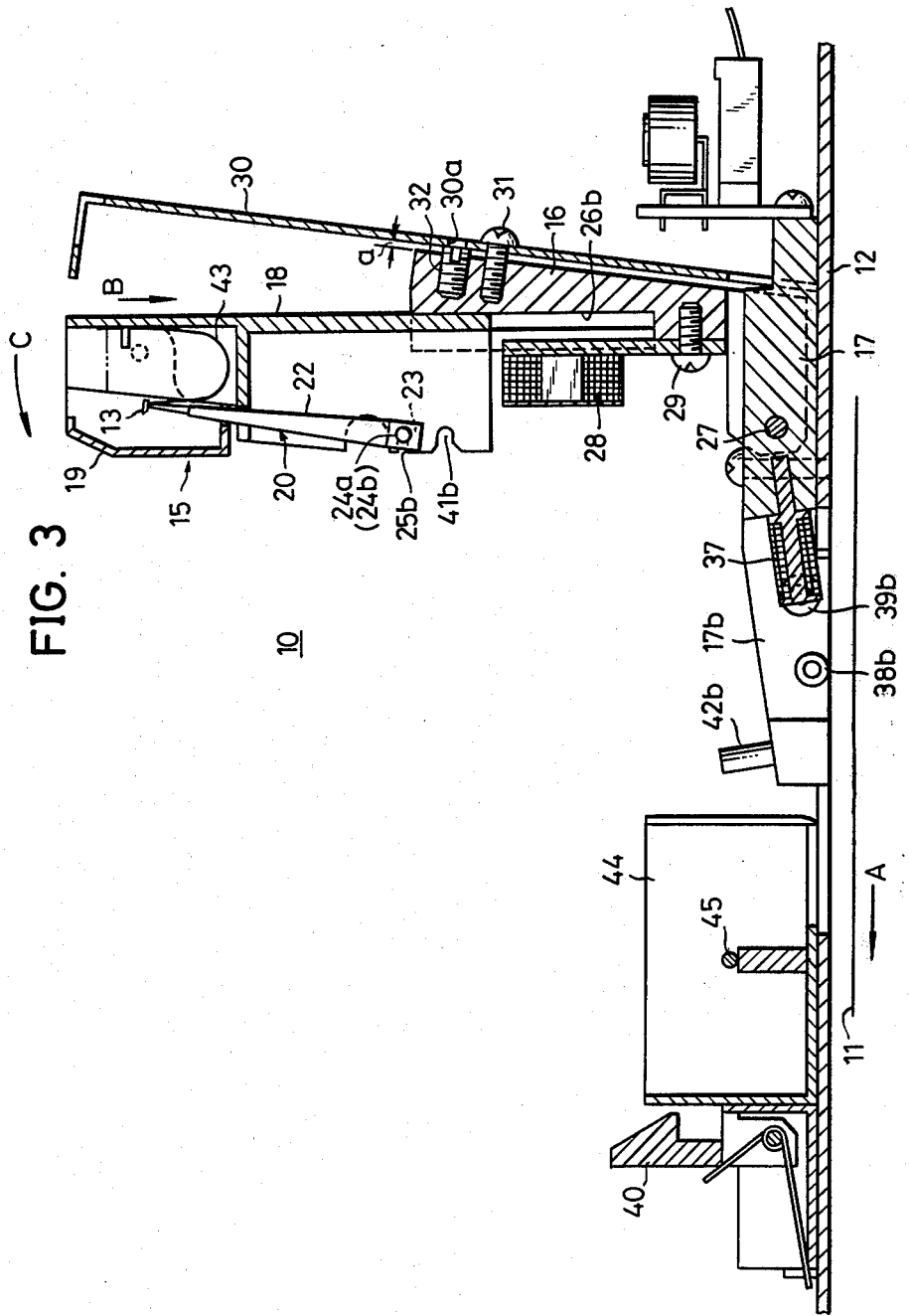

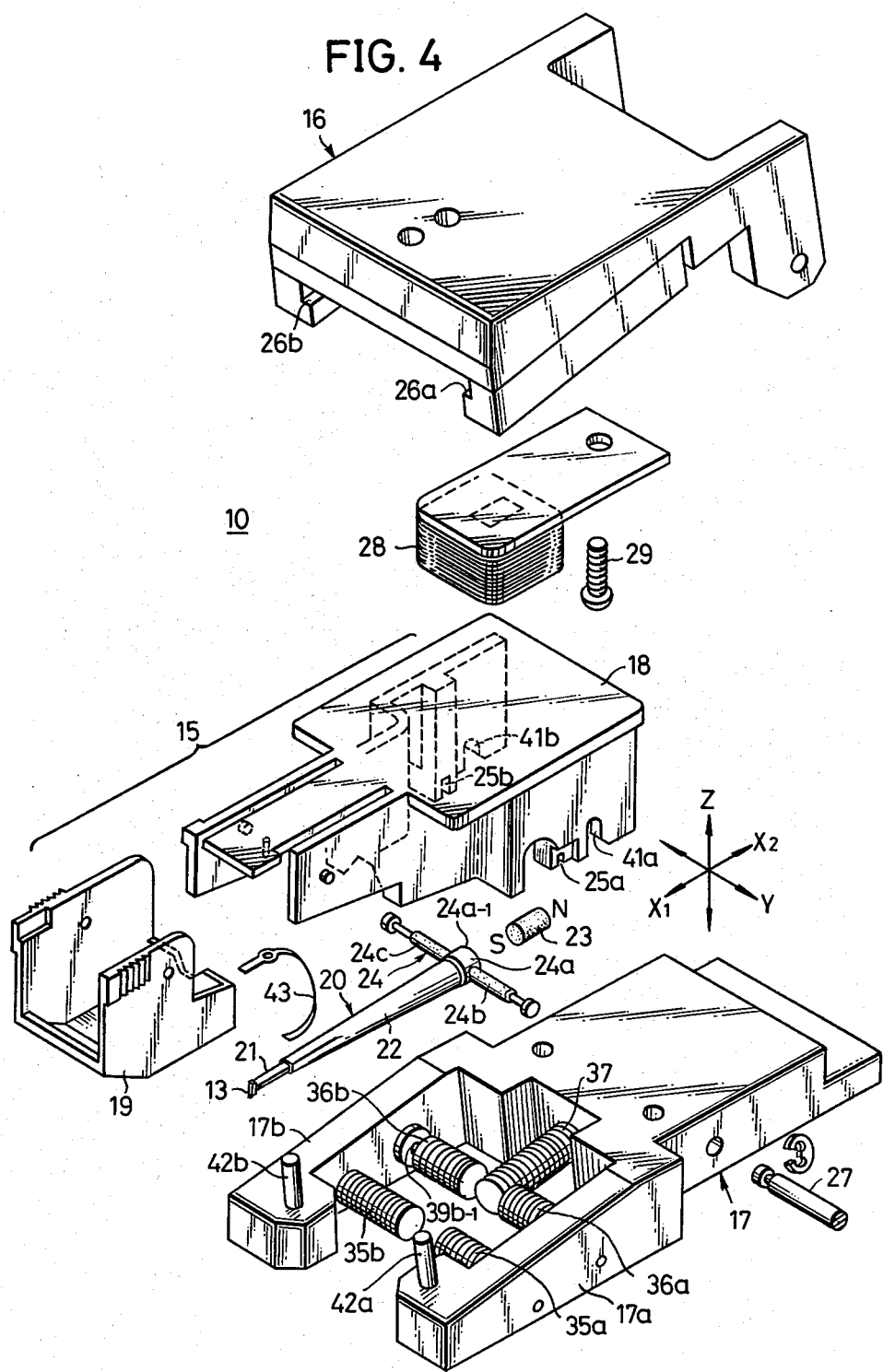

SIGNAL PICKUP DEVICE IN ROTARY RECORDING MEDIUM REPRODUCING APPARATUS

BACKGROUND OF THE INVENTION

The present invention generally relates to signal pickup devices in rotary recording medium reproducing apparatuses, and more particularly to a signal pickup device capable of controlling the tracking accurately and efficiently. The tracking control is performed in a manner such that a cantilever rotates to displace a reproducing element which reproduces recorded signals from a rotary recording medium in a direction perpendicular to the longitudinal direction of tracks of the rotary recording medium to follow and trace the same.

Heretofore, there have been apparatus of the designed type. For example, a rotary disc (referred to as "disc" hereinafter) has a video signal recorded on a spiral track as variations in the geometrical shapes corresponding to an information content. A reproducing element is caused to trace over the spiral track and reproduce the recorded video signal. In a pickup device of this character, it is necessary for the signal pickup device to trace the track accurately. For this reason, it is necessary to provide means for detecting any tracking deviation of the signal pickup device relative to the track. In response to this error, the position of the signal pickup device is controlled so that it will trace accurately over the track thereby accomplishing a tracking control.

The present applicant has previously described in a commonly assigned U.S. patent application. Ser. No. 885,579, filed Mar. 13, 1978 (U.S. Pat. No. 4,170,783) by Osamu Tajima, and entitled "Signal pickup device for reproducing an information signal recorded on a track of a rotary recording medium" a signal pickup device in which a permanent magnet member of a rectangular parallelepiped shape and having magnetic poles on the opposite lateral faces thereof is fixed to the proximal end of a cantilever, the cantilever is supported by an elastic support member at a separated point in front of the permanent magnet so as to be rotatable, and a tracking coil is disposed in the rear position with respect to the elastic support member so as to surround the permanent magnet member. On tracking control operation, a torque is produced to act on a cantilever assembly comprising the cantilever, the reproducing element, and the permanent magnet member.

A positional relationship between the permanent magnet member, the elastic support member, and the tracking coil causes a center of the torque to be located at a position which is far apart backwards (in a direction opposite to the reproducing element) with respect to the point where the elastic support member supports the cantilever.

In this connection, the torque for tracking control acts on the elastic support member is an extending (or axial) direction thereof, and the tracking control inevitably accompanies compression and stretching deformation in the axial direction of the elastic support member.

This signal pickup device is accompanied by various problems such that ① the elastic support member is brought into resonance at a specific frequency, whereby a tracking servo system is subjected to phase delay, thus deteriorating tracking accuracy, and ② a large torque sufficient to compress and stretch the elastic support member is required, which results in a substantial decrease in efficiency of the tracking control operation.

SUMMARY OF THE INVENTION

Accordingly, a general object of the present invention is to provide a novel and useful signal pickup device in a rotary recording medium reproducing apparatus, in which the above described problems have been overcome.

Another and more specific object of the present invention is to provide a signal pickup device in a rotary recording medium reproducing apparatus in which an elastic support member is disposed at a position of a permanent magnet magnetized in a longitudinal direction thereof, and tracking coils are disposed at both forward and rearward positions with respect to the elastic support member so as to confront opposite magnetic poles respectively. According to the present invention, a center of rotational torque produced on the cantilever assembly due to reaction on the permanent magnet on tracking control operation coincides with a point where the cantilever assembly is supported by the elastic support member, whereby tracking control operation is effected with high accuracy and efficiency.

Other objects and further features of the present invention will be apparent from the following description when read in conjunction with the accompanying drawings.

BRIEF DESCRIPTION OF THE DRAWINGS

FIG. 3 is an elevational view, in section, showing the signal pickup device in a state where a pickup cartridge is to be loaded;

FIG. 4 is an exploded perspective view of an embodiment of a signal pickup device of FIGS. 1 and 2;

DETAILED DESCRIPTION

Figure 1:
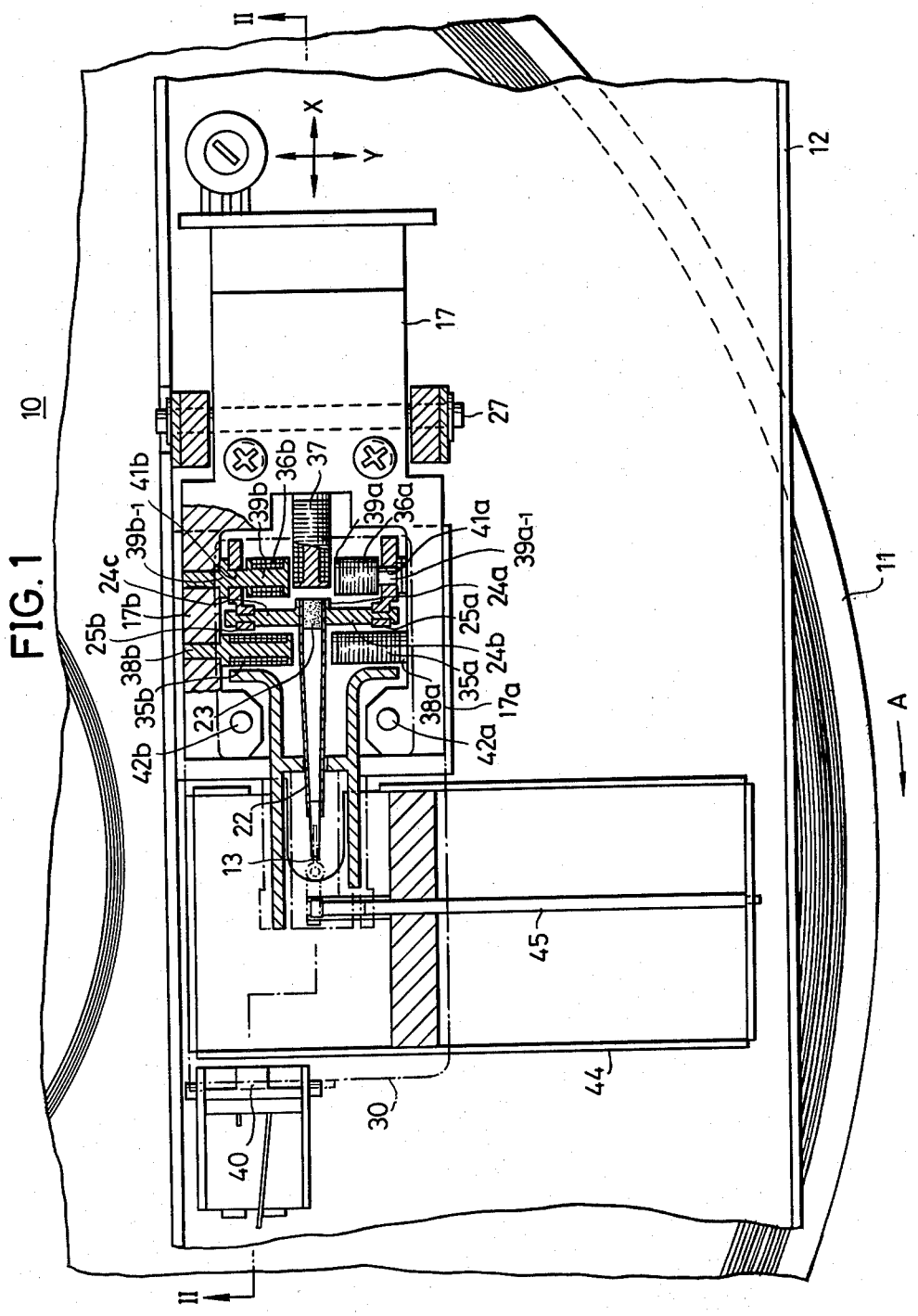
FIG. 1 is a plan view, partly in horizontal section, of an embodiment of a signal pickup device according to the present invention.

In FIGS. 1 through 4, a signal pickup device 10 is provided within a carrier 12 which moves in a radial direction of a disc 11. A reproducing stylus 13 traces relatively the spiral track of the disc 11 rotating in the direction indicated by arrow A and reproduces an information signal therefrom.

The signal pickup device 10 substantially comprises a cartridge 15, a guide member 16 for receiving and rotating the cartridge 15, and a fixed coil mounting member 17 mounted with a coil group. The cartridge 15 comprises a case 18, a lid 19, and a cantilever assembly 20 mounted with a reproducing stylus 16.

In the cantilever assembly 20, the reproducing stylus 13 is mounted at the tip end of a plate-shaped holder 21. The rear end of the holder 21 is mounted to the tip end of a cantilever 22 constructed from a pipe made of light metal such as aluminum. A permanent magnet 23 having a cylindrical shape and magnetized in a longitudinal or axial direction thereof, is insertedly fixed to a space part at the rear end of the cantilever 22. The ring-shaped part 24a of an elastic support member (suspension) 24 made of rubber, is insertedly connected to the rear end outer periphery of the cantilever 22. A pair of arms 24b and 24c unitarily extend in a direction perpendicular to the longitudinal direction of the cantilever 22, which are provided at both sides of the ring-shaped part of the support member 24.

The cantilever assembly 20 of the above described consturction is accommodated within the case 18, wherein the arms 24a and 24b of the support member 24 are pushed and inserted into slots 25a and 25b of the case 18. The lid 19 is mounted freely rotatable on the case 18, and when the signal pickup apparatus is not used, the lid 19 is in a rotated position where the reproducing stylus 13 is protected. On the other hand, when the signal pickup apparatus is being used, the lid 19 is rotated to a position where the reproducing stylus is not interfered.

The guide member 16 comprises grooves 26a and 26b for receiving the cartridge 15, and is oratably mounted on the carrier 12 by a shaft 27. A coil 28 for elevating stylus is screwed by a screw 29 onto the lower surface of the guide member 16. Further, onto the upper surface of the guide member 16 is screwed a lid 30 by a screw 31. The lid 30 is made of a metal plate and is hinged on the shaft 27. A gap dimension a between the lid 30 and the guide member 16 is appropriately determined by adjusting a screw-in amount of an adjust screw 32 through an opening 30a of the lid 30 and then by screwing the set screw 31.

The coil mounting member 17 is fixed to the carrier 12, and comprises four tracking control coils 35a, 35b, 36a, and 36b, and a single jitter compensation coil 37 mounted thereon. These tracking control coils are classified into a pair of tracking control coils 35a and 35b, and another pair of tracking control coils 36a and 36b, which are mounted inside arms 17a and 17b of the coil mounting member 17 to project inwardly therefrom so as to confront with each other. A first pair of tracking control coils 35a and 35b and a second pair of tracking control coios 36a and 36b are arranged with separated with each other in the forward and rearward directions, that is, in the axial direction of the cantilever 22. Further, the tracking control coils 35a, 35b, 36a, and 36b are respectively provided on nonmagnetic bobbins 38a, 38b, 39a, and 39b which are embeddedly mounted to the arms 17a and 17b at the inside thereof.

Next to be described is how the cartridge 15 is loaded to a predetermined position. Loading operation comprises two steps, that is, insertion and rotation.

Referring to FIG. 3, upon loading, the lid 30 is rotated together with the guide member 16 to a substantially upright open position. The cartridge 15 is inserted, in the arrow direction B, into the guide member 16, with lateral side flanges of a top plate of the case 18 engaged into guide grooves 26a and 26b of the guide member 16. This insertion brings the permanent magnet 23 of the cantilever assembly 20 to confront the stylus elevating coil 28.

Figure 2:
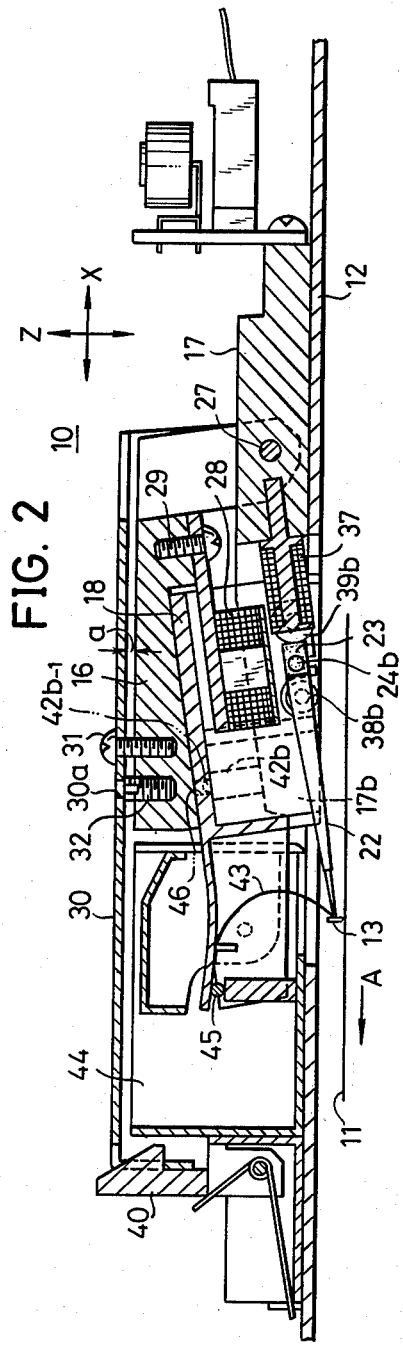
FIG. 2 is a vertical section taken along the line II—II in FIG. 1 as viewed in the arrow direction.

Then, the lid 19 of the cartridge 15 is rotated clockwise to open, and the lid 30 is rotated, in the arrow direction C, to be closed. The lid 30 is latched at a horizontal closed state thereof by a latch 40, as indicated in FIG. 2.

When the lid 30 is closed, the cartridge 15 (that is, the cantilever assembly 20) is rotated, with being held in the guide member 16, about the shaft 27, and the arms 24b and 24c of the elastic support member 24 are respectively brought downwards in the spaces formed between the coils 35a and 35b, and the coils 36a and 36b.

Furthermore, the cartridge 15 is finally positioned with respect to the fixed coil mounting member 17. That is, positioning slots 41a and 41b on side walls of the case 18 are respectively engaged with the bobbins 39a and 39b at narrow parts with flanges 39a-1 and 39b-1 thereof, and further make contact with the flanges of the narrow parts 39a-1 and 39b-1, whereby the case 18 is positioned with respect to the directions of arrow X and Y as viewed in FIG. 1. The slots 41a and 41b may be engaged with a part of the coil mounting member 17 instead of the bobbins 39a and 39b. Furthermore, the top plate of the case 18 abuts against studs 42a and 42b, whereby the case 18 is positioned with respect to the direction of arrow Z as viewed in FIG. 2. The metal-plate lid 30 is latched by the latch 40, with free end thereof being forcibly deflected downwards by an amount determined by the gap dimension a. Spring force generated by this deflection serves to press the case top plate against the studs 42a and 42b.

Accordingly, the cartridge 15, that is, the cantilever assembly 20 is positioned with respect to the directions of arrow X, Y, and Z, that is, in both horizontal and vertical planes. The arms 24b and 24c of the elastic support member 24 are respectively inserted in the spaces formed between the coils 35a and 36a, and the coils 35b and 36b. Moreover, a metal ribbon 43 which is connected at one end thereof to the reproducing stylus 13 makes press-contact with a central conductor 45 of a cavity resonator 44.

Accordingly, the signal pickup device 10 now assumes an operable state as indicated in FIGS. 1 and 2.

As to positioning of the cartridge 15, a modification will be made so that an opening 46 of the case top plate engages with a semi-spherical projection 42b-1 and the top plate around the opening 46 presses against an annular top surface of the stud 42b, as indicated by two-dot chain lines in FIG. 2. This construction causes the case 18 to be positioned in the horizontal plane and the height direction simultaneously.

In this signal pickup device 10, two pairs of tracking coils 35a and 35b, and 36a and 36b are arranged so that the axes thereof are aligned in a direction parallel to the disc 11 and perpendicular to the magnetized direction of the permanent magnet 23. A pair of tracking coils 35a and 35b is disposed at a position nearer to the reproducing stylus (that is, forwards) with respect to the elastic support member 24, to have axial edge surfaces of the tracking coils 35a and 35b located near the S pole of the permanent magnet 23. Another pair of tracking coils 36a and 36b is disposed at a position further from the reproducing stylus (that is, rearwards) with respect to the elastic support member 24, to have axial edge surfaces of the tracking coils 36a and 36b located near the N pole of the permanent magnet 23.

The axis of the coil 27 is arranged in the same direction as the magnetized direction of the permanent magnet 23.

In a state in which current is not applied to the coil 28, the cantilever 22 is supported by the support member 24, and the reproducing stylus 13 is positioned at a height where the reproducing stylus 13 does not make contact with the disc 11. Upon reproduction, when current is applied to the coil 28, the cantilever 22 receives a downward force, and rotates downwards while twisting the support member 24. Accordingly, the reproducing stylus 13 is applied with a predetermined stylus pressure, and makes contact with the disc 11.

By flowing a current having a level and direction respective of the tracking error signal through the tracking control coils 35a, 35b, 36a, and 36b, opposite magnetic polarities are introduced at the edge surfaces of the opposing coils. Hence, repulsive force is introduced on the hand, and on the other, attractive force is introduced between the magnetic polarities of the permanent magnet 23. Accordingly, the cantilever 22 is displaced by a predetermined quantity in a direction the tracking deviation is to be compensated, in the radial direction of the disc 11 shown by arrow Y of FIG. 1.

Figure 6:
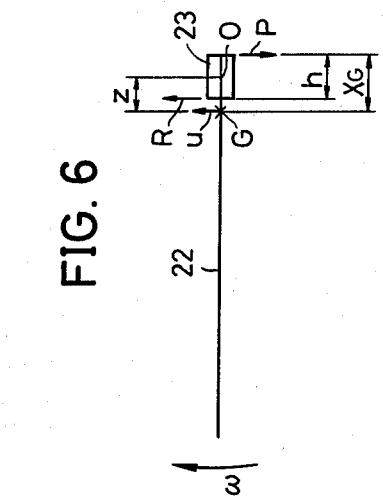
FIG. 6 is a simplified diagram for explaining how rotational force acts on the cantilever assembly.
Figure 5:
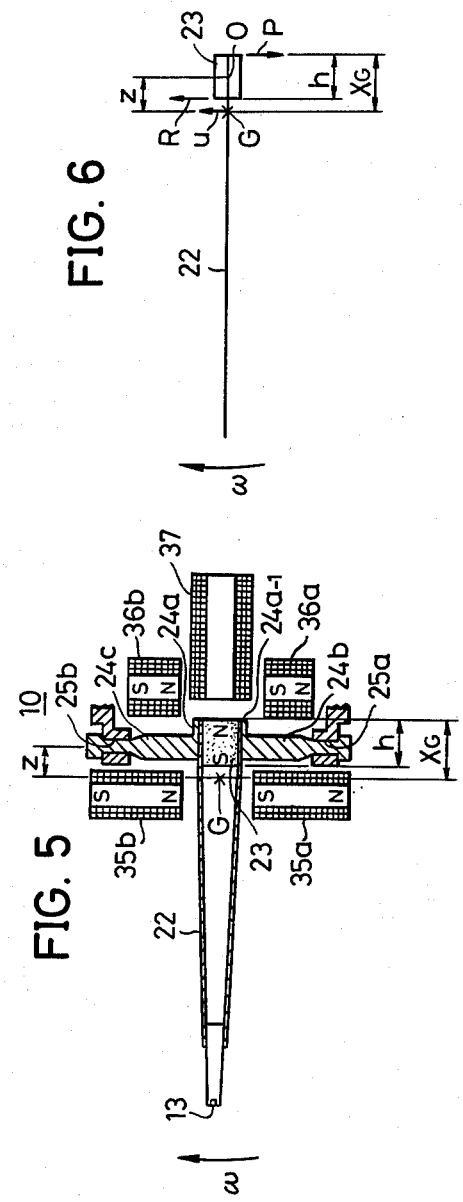
FIG. 5 is a plan view showing an essential part of the signal pickup device of FIG. 1.

When the tracking control coils 35a, 35b, 36a and 36b generate magnetic polarities as indicated in FIG. 5, for example, forces P and R are generated at opposite magnetic polarities of the permanent magnet 23, as indicated in FIG. 6. These forces P and R, which act as a couple on the permanent magnet 23, generate a torque. As a result of this torque, the cantilever 22 rotates in the direction of arrow, and the reproducing stylus 13 is thereby displaced in the radial direction toward the disc center. Conversely, when the tracking control current flows in the opposite direction, the forces opposite to the above described forces P and R are generated at the opposite magnetic polarities of the permanent magnet 23 to rotate the cantilever 22 in a direction opposite to the arrow. The reproducing stylus 13 is displaced toward the outside periphery of the disc 11. Thus, a tracking control is accomplished so that the reproducing stylus 13 traces along the track. The forces P and R depend upon the winding turns of the coils 35a, 35b and 36a, 36b, and the amount of the tracking control current supplied to the coils.

The factors of the coils 35a, 35b, 36a and 36b and the cantilever assembly 20 are determined so that the center of the torque due to the forces P and R coincides with a support point O where the cantilever assembly 20 is supported by the elastic support member 24 (i.e., a center line of the cylindrical arms 24b and 24c).

Next to be described is how the above factors are determined in the signal pickup device 10.

In order for the center of the rotational torque due to the forces P and R coinciding with the support point O, the cantilever assembly 20 must satisfy the following physical impulsive force equations:

$$M \cdot u = R - P$$

$$I_o \cdot \omega = P(X_G - z) + R(h - X_G + z)$$

$$u = \omega \cdot z$$

where:

M is the mass of the cantilever assembly 20;

P and R are forces acting on the axial edges of the permanent magnet 23;

u is the moving speed of center of gravity of the cantilever assembly when the forces P and R are applied thereto;

$I_o$ is the moment of inertia of the cantilever assembly 20 about the support point O;

is the angular speed of the cantilever assembly 20;

$\omega$ is the angular speed of the cantilever assembly 20;

z is the distance between the support point O and the center of gravity G;

h is the distance between the opposite magnetic poles of the permanent magnet 23; and $X_G$ is the distance between the free end of the permanent magnet 23 and the center of gravity G.

By eliminating factors u and $\omega$, the equation (1) is rearranged as follows;

$$[R(X_G-z)+R(h-X_G+z)]z \cdot M = (R-P)I_o \qquad (2)$$

Moreover, the relationship of moment of inertia is expressed by a following equation;

$$I_o = I_G + M \cdot z^2 \qquad (3)$$

where, $I_G$ is the moment of inertia of the cantilever assembly 20 about the center of gravity G.

From equations (2) and (3), is obtained a following equation (4).

$$\frac{P}{R} = \frac{I_G + M \cdot z \cdot (X_G - h)}{I_G + M \cdot z \cdot X_G} \qquad (4)$$

Accordingly, when the winding turns, resistance and disposition with respect to the permanent magnet 23 of the tracking coils 35a, 35b, 36a and 36b, and mechanical various factors of the cantilever assembly 20 are determined so as to satisfy the above given equation (4), the torque on the cantilever assembly 20 induced by the coils 35a, 35b, 36a and 36b is generated as a torque about the support point O as a center thereof.

The dimension and position of the ring-shaped part 24a and the arms 24b and 24c of the elastic support member 24 is determined so that when the ring-shaped part 24a and the cantilever 22 are assembled together, with projected edge 24a-1 of the ring-shaped part 24a coinciding with the edge face of the cantilever 22 (or permanent magnet 23), the distances $X_G$ and z are determined inevitably so as to satisfy the equation (4) in connection with the predetermined forces P and R. Accordingly, after assembly, no adjusting operation is required.

In the signal pickup device 10 thus assembled, the torque to be applied on the cantilever assembly 20, upon tracking control operation, is generated as a torque exactly about support point O. On the arms 24b and 24c of the elastic support member 24, is thereby applied only the bending force. No axial force is applied to the cylindrical arms 24b and 24c. In this connection, the force counter to the tracking control operation is limited to bending drag of the elastic support member 24, which ensures that the tracking control operation is accomplished with small torque. Moreover, the tracking control operation is not accompanied by axial compression and stretching deformation of the arms 24b and 24c of the elastic support member 24. This deformation becomes a cause of resonance of the cantilever assembly 20. As a result, the actual tracking control operation is accomplished with high efficiency and accuracy, without accompanying any energy absorption and phase delay due to resonance.

In the present embodiment of the invention, each pair of tracking coils is disposed at the front and rear sides of the support member 24. In this arrangement, magnetic flux of the permanent magnet 23 is utilized more efficiently, thus ensuring more efficient tracking control operation. In principle, a structure wherein a single tracking coil is disposed respectively at front and rear sides may be adopted, this structure is involved within the scope of the present invention.

The bobbins 38a, 38b, 39a and 39b are made of ferromagnetic material, which results in more effective utilization of magnetic flux of the permanent magnet 23. Accordingly, tracking control operation is carried out with higher efficiency. In place of the whole ferromagnetic bobbins, bobbin structure may be used wherein ferromagnetic material constitutes a part of the bobbin such that an iron rod is embedded in the center of the bobbin and the iron column occupies the bobbin at a side aparted from the permanent magnet.

Furthermore, when a jitter compensation current having a level and polarity respective of the jitter which is to be compensated, is passed through the jitter compensation coil 37, a magnetic field is introduced between the permanent magnet 23 and the coil 37. When a magnetic polarity which is the same as that of the permanent magnet 23 is introduced at the edge surface of the coil 37 opposing the permanent magnet 23, repulsive force is introduced between the coil 37 and the permanent magnet 23 and displaces the cantilever 22 in the direction shown by an arrow X1, to compensate for the jitter. On the other hand, when a magnetic polarity which is opposite to that of the permanent magnet 23 is introduced at the edge surface of the coil 37 opposing the permanent magnet 23, attractive force is introduced between the coil 37 and the permanent magnet 23 and displaces the cantilever 22 in the direction shown by an arrow X2, to compensate for the jitter.

In the above described signal pickup device 10, the cantilever assembly 20 (i.e., cartridge 15) is positively positioned at a predetermined position with respect to the coils, which ensures that tracking control and jitter compensation are carried out accurately. The coils 35a, 35b, 36a, 36b and 37 are respectively mounted on not a rotatable mounting member but the stationally mounting member 37. In this connection, even though the reaction to the force for moving the cantilever assembly 20 is applied on each coil, the coils do never wobble but are held steady, which also ensures the accurate tracking control and jitter compensation.

Further, this invention is not limited to these embodiments but various variations and modifications may be made without departing from the scope of the invention.

What is claimed is:

1. A signal pickup device in a rotary recording medium recording apparatus comprising:
    a cantilever having at a free distal end thereof a reproducing element for reproducing recorded signals from tracks of a rotary recording medium;
    a permanent magnet magnetized in an axial direction of said cantilever and fixed to said cantilever at proximal end thereof;
    an elastic support member extending perpendicular to a longitudinal direction of said tracks and supporting the proximal end of said cantilever, said cantilever being rotatable, accompanied by elastic deformation of said elastic support member; and
    tracking control coil means supplied with a tracking control current to attract and repulse said permanent magnet to cause said cantilever to rotate, said reproducing element being displaced in a direction perpendicular to the longitudinal direction of the recording tracks of said rotary recording medium to trace the tracks,
    said tracking control coil means comprising at least a single rear-side tracking coil disposed at a position opposite to said reproducing element with respect to said elastic support member to confront a magnetic pole of said permanent magnet and at least a single front-side tracking coil disposed at a position toward said reproducing element with respect to said elastic support member to confront an opposite magnetic pole of said permanent magnet, with the axes of said rear-side and front-side tracking coils being arranged in a direction perpendicular to an axial direction of said cantilever.

2. A signal pickup device as claimed in claim 1 in which said rear-side tracking coil and said front-side tracking coil are respectively made up with two coils disposed at left and right sides of said permanent magnet to confront with each other.

3. A signal pickup device as claimed in claim 1 wherein said rear-side tracking coil and said front-side tracking coil are respectively fixed to a coil mounting member mounted on a carrier.

4. A signal pickup device as claimed in claim 1 wherein said cantilever, said elastic support member, said permanent magnet and said tracking control coil means are arranged so that a center of a torque introduced by said permanent magnet coincides with a point where said cantilever is supported by said elastic support member.

5. A signal pickup device as claimed in claim 1 wherein said permanent magnet is applied at magnetic poles thereof with forces in a proportion satisfying following equation:

$$\frac{P}{R} = \frac{I_G + M \cdot z(X_G - h)}{I_G + M \cdot z \cdot X_G}$$

where:
P is the force generated by the rear-side tracking control coil and acting on a rear-side magnetic pole of the permanent magnet;
R is the force generated by the front-side tracking control coil and acting on a front-side magnetic pole of the permanent magnet;
$I_G$ is the inertia of moment of a cantilever assembly made up with said cantilever, said reproducing stylus and said permanent magnet about a center of gravity thereof;
M is the mass of the cantilever assembly;
$X_G$ is the distance between the rear-side magnetic pole of said permanent magnet and the center of gravity of said cantilever assembly;
z is the distance between the center of gravity of said cantilever assembly and a point where said cantilever assembly is supported by said elastic support member; and
h is the distance between the opposite magnetic poles of said permanent magnet.

6. A signal pickup device as claimed in claim 5 wherein said elastic support member has a ring-shaped part for engaging around the proximal part of said cantilever, said ring-shaped part and said cantilever being assembled with the edge of said ring-shaped part being coincide with the proximal end of said cantilever to determine the distance $X_G$ and z naturally.

* * * * *

UNITED STATES PATENT AND TRADEMARK OFFICE
CERTIFICATE OF CORRECTION

PATENT NO. : 4,382,293

DATED : May 3, 1983

INVENTOR(S) : Osamu Tajima and Takefumi Shioiri

It is certified that error appears in the above—identified patent and that said Letters Patent is hereby corrected as shown below:

Col.1   Line 59, change "is" to --in--;
        Line 60, delete ", and the", and insert therefor, --. The--;

Col.2   Line 52, change "of" to --across--;
        Line 53, delete "relatively";

Col.3   Line 21, change "ortatably" to --rotatably--;
        Line 42, change "coios" to --coils--, delete "arranged with";
        Line 43, change "with" to --from--;
        Line 50, change "Loading" to --The loading--;

Col.4   Line 18, after "with" insert --its--;
        Line 31, change "press-contact" to --a pressing-contact--;

Col.5   Line 11, change "quantity" to --distance--; after "direction" insert --which compensates for--;
        Line 12, delete "is to be compensated,";

Col.6   Line 8, after "of" (first occurrence), insert --the--;
        Line 9, change "a" to --the--;
        Line 21, before "resistance", insert --the--;
        Line 23, before "mechanical", insert --the various--;
        Line 24, delete "various";
        Line 44, change "On" to --Only a bending force is applied--;
        Lines 45 and 46, after "24" change "," (comma) to a --.-- (period); delete "is thereby applied only the bending force";

UNITED STATES PATENT AND TRADEMARK OFFICE
CERTIFICATE OF CORRECTION

PATENT NO. : 4,382,293

DATED : May 3, 1983

INVENTOR(S) : Osamu Tajima and Takefumi Shioiri

It is certified that error appears in the above-identified patent and that said Letters Patent are hereby corrected as shown below:

Col.7    Line 10, after "side" insert --which is--; change "aparted" to --apart--;

Line 38, change "never" to --not--.

Signed and Sealed this

Thirteenth Day of December 1983

[SEAL]

Attest:

GERALD J. MOSSINGHOFF

Attesting Officer     Commissioner of Patents and Trademarks